United States Patent [19]

Ansari et al.

[11] 4,090,181

[45] May 16, 1978

[54] SHAFT ROTATION MONITORING SYSTEM

[75] Inventors: Mohammad Tariq Ansari, Houston; Richard Lee Gobert, Pasadena, both of Tex.

[73] Assignee: Allied Industries, Inc., Houston, Tex.

[21] Appl. No.: 752,276

[22] Filed: Dec. 20, 1976

[51] Int. Cl.² ........................ G01P 3/56; G08B 21/00
[52] U.S. Cl. ..................................... 340/271; 324/161
[58] Field of Search ...................... 340/271, 263, 62; 324/161, 166, 78 Q

[56] References Cited

U.S. PATENT DOCUMENTS

| | | | |
|---|---|---|---|
| 3,611,343 | 10/1971 | Schoenbach | 340/271 |
| 3,699,563 | 10/1972 | Cass | 340/268 |
| 3,739,367 | 6/1973 | Fathauer | 340/271 |
| 3,793,622 | 2/1974 | Hida et al. | 340/62 |
| 3,932,812 | 1/1976 | Milligan | 324/161 |
| 3,950,700 | 4/1976 | Weisbart | 324/177 |

*Primary Examiner*—John W. Caldwell, Sr.
*Assistant Examiner*—Joseph E. Nowicki
*Attorney, Agent, or Firm*—Kenway & Jenney

[57] ABSTRACT

A system for monitoring the rotational velocity of a shaft. The system includes a shaft pulse generator, an off-delay circuit and on-delay circuit. The sensor provides a series of pulses having an instantaneous repetition rate proportional to the rotational velocity of a shaft. The off-delay circuit includes a retriggerable multivibrator. In response to each pulse in the series of pulses, the multivibrator switches to a first binary state if in a second binary state at the time of an applied pulse, or remains in the first binary state if in that state at the time of the applied pulse. The multivibrator is further responsive to the most recent pulse in the series to switch from its first binary state to its second binary state a first predetermined period after the most recent pulse. The multivibrator provides a state signal representative of its current state. The on-delay circuit is responsive to the multivibrator state signal to provide a control signal representative of one binary state only when the multivibrator has been in its first binary state continuously for more than a second predetermined period.

17 Claims, 8 Drawing Figures

SHAFT ROTATION MONITORING SYSTEM

BACKGROUND OF THE DISCLOSURE

The present invention relates generally to the instrumentation field, and more particularly, to systems for monitoring the rotational velocity of a shaft.

There are sytems known in the art for both sensing the current rotational speed of a shaft and also for monitoring shaft speed. However, such systems are narrowly configured in general to monitor shaft speeds in preset unadjustable ranges. As a result, custom circuits must be adapted to the various user requirements. In addition, the known monitoring systems may typically be configured with an alarm device which is activated as soon as a detected speed change occurs. As a result, such systems may readily be subject to false triggering resulting from noise. Such systems also are not capable of operating in an overspeed detection mode under conditions where relatively short excursions of shaft velocity beyond the predetermined limits are permitted, or in an underspeed detection mode under conditions where the shaft velocity must continually remain above the limit for at least a predetermined period in order to avoid an alarm condition.

Furthermore, the prior art systems typically include sensors which are indirectly coupled to the shaft to be measured, for example, through the use of belt or chain drive mechanisms. With such mechanisms, these systems are relatively large, have relatively large maintenance requirements, and are subject to the failure of the belt or chain drive mechanisms. Although certain prior art systems employ optical sensors which are coupled to a shaft to be monitored, those systems often either are inaccurate due to ambient light-induced noise, or include relatively complex and correspondingly expensive light tight housings for the sensor assembly.

Accordingly, it is an object of the present invention to provide a monitoring system having an adjustable controlled limit about which shaft rotational velocity is monitored.

It is another object of the present invention to provide a shaft rotational velocity monitoring system in conjunction with an overspeed alarm device, whereby relatively short excursions in shaft velocity above a preset limit are permitted without initiating an alarm condition.

Still another object of the present invention is to provide a shaft rotational velocity monitoring system in conjunction with an underspeed alarm device, whereby the shaft must maintain a velocity above a preset limit for at least a predetermined interval in order to avoid an alarm condition.

Yet another object of the present invention is to provide a direct coupled shaft rotation sensor in conjunction with a means to monitor the shaft rotational velocity.

A further object of the present invention is to provide a direct coupling sensor to a shaft to be monitored in order to permit a relatively small, and low maintenance shaft velocity monitor.

Another object of the present invention is to provide a monitoring system having a shaft rotational velocity detector and associated monitor and alarm circuit which may be adapted to identify times a which a shaft is rotating above a predetermined speed or to identify times at which a shaft is rotating below a predetermined speed.

It is a further object of the present invention to provide an optically coupled sensor for a shaft rotational velocity monitor wherein the sensor is operative in the infra-red portion of the spectrum, thereby providing relatively high immunity from error caused by ambient light.

SUMMARY OF THE INVENTION

Briefly, the pesent invention includes a shaft rotation sensor, an off-delay timing circuit, and an on-delay timing circuit. The shaft rotation sensor provides a series of pulses having an instantaneous repetition rate proportional to the rotational velocity of the shaft to be monitored. In one embodiment, the sensor includes an infra-red light emitting diode and an associated phototransistor positioned on opposite sides of a disc attached directly to the rotating shaft. The disc includes a circumferential region with radial slots uniformly distributed about the rotational axis. As the shaft rotates, the slotted region of the disc chops the light passing between the light emitting diode and phototransistor so that the phototransistor provides a series of pulses having an instantaneous pulse repetition rate proportional to the rotational velocity of the shaft. With this infrared operative configuration, the sensor is relatively immune to interference due to ambient light.

The off-delay circuit includes a retriggerable monostable multivibrator. In response to each pulse in the series of pulses, the multivibrator switches to a first binary state if in a second binary state at the time of an applied pulse, or remains in the first binary state if in that state at the time of the applied pulse. The multivibrator is further responsive to the most recent pulse in the series to switch from its first binary state to its second binary state a first predetermined period after the most recent pulse. The multivibrator provides a state signal representative of its current state.

The on-delay circuit is responsive to the state signal and provides an alarm control signal representative of one binary state only when the multivibrator has been in its first binary state continuously for more than a second predetermined period. The alarm control signal is representative of the other binary state otherwise.

In various forms of this invention, an alarm device may be configured as an overspeed alarm to respond to the alarm control signal only when the shaft rotational velocity is and has been above a preset limit for a predetermined period. Alternatively, an alarm device may be configured to respond as an underspeed alarm to the alarm control signal at all times except when the shaft rotational velocity is and has been above a preset limit for a predetermined period. The present invention includes means to adjustably select the duration of the above-noted predetermined periods.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
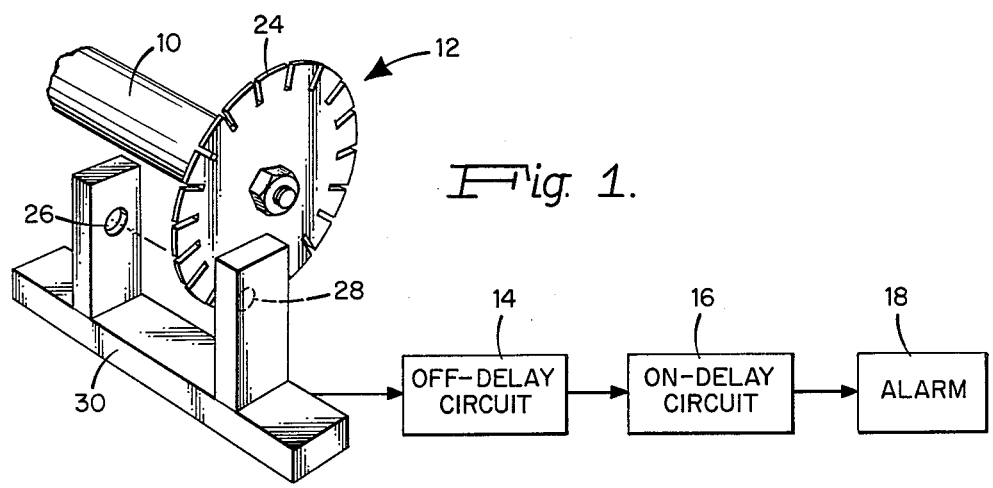
FIG. 1 shows, partially in schematic form and partially in block diagram form, a system embodying the present invention.
Figure 2:
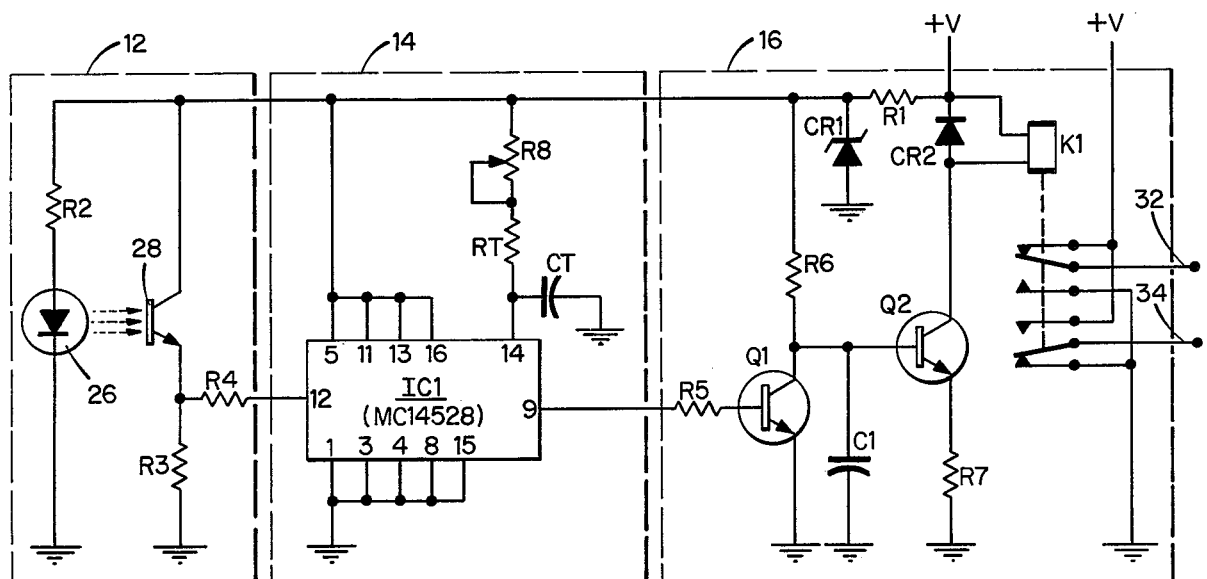
FIG. 2 shows, in schematic form, an exemplary circuit for the system of FIG. 1.

FIG. 1 shows a system for monitoring the rotational velocity of a shaft 10. FIG. 2 illustrates an exemplary circuit in schematic form suitable for use in the system of FIG. 1.

The monitoring system includes a shaft rotation sensor assembly 12, off-delay circuit 14, on-delay circuit 16 and alarm 18. The sensor assembly 12 includes a disc 24 rigidly attached to the shaft 10 and adapted for rotation with the shaft. The assembly 12 further includes an electromagnetic radiation source 26, with an associated detector 28 positioned on opposite sides of the disc 14 by a support assembly 20. On disc 24 is a set of radically extending slots arranged in a circular track, with the slots being uniformly distributed about the axis of rotation. The radiation source 26 in the present embodiment is an infrared light emitting diode and and the detector 28 is an infrared light sensitive phototransistor. Source 26 and detector 28 are directed toward each other and arranged so that the slots and solid regions in the circular track on disc 24 alternately intercept and pass the light beam as the disc rotates with shaft 10. With this configuration having a uniform distribution of the slots in the disc 24, the detector 28 provides a series of pulses characterized by an instantaneous pulse repetition rate proportional to the rotational velocity of the shaft 10.

In other embodiments, the sensor assembly 12 may take alternative forms. For example, the disc 24 may include a circular track of regions alternately characterized by high and low optical reflectivity in lieu of the slots, with the source and detector being positioned on the same side of the disc. Similarly, other forms of detectable characteristics and associated sources and sensors might be used in keeping with the present invention.

In the present embodiment, the phototransistor 28 provides the stream of pulses across resistor R3 as the shaft 10 rotates. This pulse signal is applied to the off-delay circuit 14 by way of resistor R4.

Circuit 14 includes integrated circuit IC-1 and timing resistors R8, $R_T$ and capacitor $C_T$. Integrated circuit IC-1 is a CMOS retriggerable monostable multivibrator, such as type MC 14528, manufactured by Motorola, Inc., Phoenix, Arizona. Pin 9 of IC-1 provides an output signal having a binary value representative of the state of the multivibrator IC-1.

The multivibrator is responsive to each pulse applied to its input (pin 12) by way of resistor R4 to switch to a first binary state if the multivibrator is in a second binary state at the time of the applied pulse, or to remain in its first binary state if already in that state at the time. The multivibrator is configured so that the timing components R8, $R_T$ and $C_T$ control the duration in the first binary state to be a first predetermined period, $T_1$, following an applied pulse (where $T_1$ approximately equals the product $(R8+R_T)\cdot C_T$) unless a further pulse is applied by way of resistor R4 during that first predetermined period. In the latter case, the period in which the multivibrator remains in its first state is extended by at least one additional first predetermined period. Thus, the multivibrator switches from its first to its second binary state only a first predetermined period after the most recently applied pulse.

The on-delay circuit 16 includes coupling resistor R5, transistor Q1, charging resistor R6, capacitor C2, transistor Q2, resistor R7 and relay K1. In conjunction with resistor R6 of the off-delay circuit 14, the capacitor C1 forms a delay circuit for the state signal produced at pin 9 of IC-1. With pin 9 high (i.e. when the multivibrator is in its second binary state in the present embodiment), transistor Q1 is in its saturated state and the capacitor C1 is discharged through transistor Q1, with the transistor Q2 remaining in its nonconductive state. When pin 9 of IC-1 switches low (i.e. when the multivibrator is in its first binary state in the present embodiment), transistor Q1 switches to its non-conductive state, and the voltage across capacitor C1 increases from the Q1 saturation drop toward the positive supply voltage, +V. When the voltage across C1 exceeds the turn-on voltage associated with the transistor Q2 and resistor R7 configuration, Q2 switches to its conductive state, thereby energizing relay K1. The time, $T_2$, between the switching of Q1 to its off state and the switching of Q2 to its conductive state, is approximately equal to the product R6·C1.

When Q1 switches from its non-conductive state to its conductive state as the pin 9 signal switches from low to high, C1 is quickly discharged through the transistor Q1, and Q2 turns off almost immediately. The time constant for discharging C1 is the product of the capacitance of C1 and the saturation resistance of transistor Q1. As a result of these switching operations, the output terminals 32 and 34 of on-delay circuit 16 provide complementary binary signals representative of the state of transistor Q2.

Table I lists suitable components for use with the circuit of FIG. 2. In Table I, resistor (potentiometer) R8 is listed with its full resistance value, although in the description of the circuit of FIG. 2 herein, the designation R8 is used to denote the actual value of resistance between $R_T$ and the supply voltage, which of course is dependent upon the position of the wiper arm of R8.

TABLE I

| | |
|---|---|
| R1 - 120 ohms | C1 - 250 μf |
| R2 - 560 ohms | Q1 - 2N3415 |
| R3 - 12K ohms | Q2 - 2N3415 |
| R4 - 33K ohms | CR1 - 1N4742 |
| R5 - 33K ohms | CR2 - 1N4004 |
| R6 - 18K ohms | IC-1 - MC14528 |
| R7 - 47 ohms | |
| R8 - 5M ohms | |

The timing components for the multivibrator, R8, $R_T$ and $C_T$, are selected depending on the desired rate at which the shaft 10 is expected to rotate, disc size, and the slot arrangement. R8 provides an adjustable control for the multivibrator, thereby permitting use of a single embodiment the present invention in a large variety of applications. Of course, in other embodiments, a single resistor may be used in lieu of the series coupled resistors R8 and $R_T$. For the present configuration, with an approximately 3-inch diameter circular track having 24 uniformly spaced slots, Table II gives values suitable for these components for different ranges of shaft rotation velocity.

TABLE II

| RPM Range | $R_T$ | $C_T$ |
|---|---|---|
| 1 - 2 | 2M ohm | 1 μf |
| 1.5 - 3 | 1.5M ohm | 1 μf |
| 2 - 10 | 1M ohm | .47 μf |
| 8 - 25 | 2M ohm | .1 μf |

Figure 3:
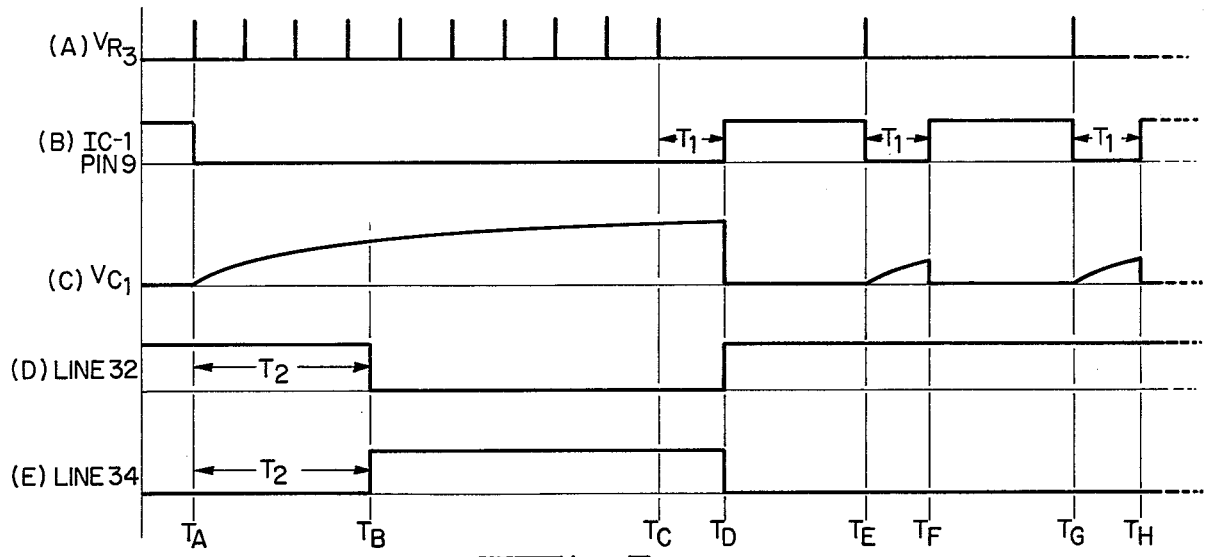
FIG. 3A–3E show waveforms illustrating the operation of the system of FIGS. 1 and 2.

The waveforms in FIGS. 3A–3E illustrate the operation of the circuit of FIG. 2. FIG. 3A shows an exemplary series of voltage pulses produced by transistor 28 across resistor R3 in response to the motion of shaft 10. FIG. 3B shows the state signal produced by multivibrator at pin 9 of IC-1 in response to the pulses applied at pin 12. FIG. 3C shows the voltage across capacitor C1, and FIGS. 3D and 3E show the voltage on the complementary output lines 32 and 34.

In response to each applied pulse, the retriggerable multivibrator either switches to, or remains in, its low (first binary) state and remains in that state for a time period at least equal to $T_1$ seconds (determined by R8, $R_T$ and $C_T$). In response to the exemplary pulse stream of FIG. 3A, the multivibrator switches to its first binary state of $T_A$ and remains in that state until $T_D$ (which is $T_1$ seconds after the pulse occurring at $T_C$) before returning to its high (second binary) state. Subsequently, the multivibrator switches to its first and back to its second binary state $T_1$ seconds later in response to the pulses at $T_E$ and $T_G$.

The state signal at pin 9 controls the switching operation of transistor Q1 to provide the voltage across capacitor C1 as illustrated in FIG. 3C. Initially (prior to $T_A$), Q1 is in its conductive state so that the resultant voltage across capacitor C1 equals the saturation drop of Q1, i.e. approximately zero volts. When the multivibrator switches states at $T_A$ so that pin 9 becomes low, Q1 turns off and capacitor C1 begins to charge toward the supply voltage with a time constant equal to the product of R6 and C1. In the example of FIGS. 3A–3E, the interpulse period for the first ten pulses is shorter than $T_1$, and the charging time constant for C1 (i.e. C1·R6) is sufficiently short so that the voltage across C1 increases beyond the threshold at which transistor Q2 turns on. This threshold is exceeded at $T_B$ (which is $T_2$ seconds after $T_A$). As soon as the multivibrator returns to it binary one state (at $T_D$), transistor Q1 turns on, rapidly discharging capacitor C1 and turning off transistor Q2.

In response to the pulses at $T_E$ and $T_G$, the multivibrator switches to its first binary state and then returns to its second binary state less than $T_2$ seconds after Q1 switches off, thereby causing transistor Q1 to discharge C1 before the voltage across C1 exceeds the turn-on threshold for transistor Q2. As a result, Q2 does not change state in response to the pulses at $T_E$ and $T_G$. FIGS. 3D and 3E illustrate the complementary output lines 32 and 34, respectively, of relay K1, with each being representative of the state changes of transistor Q2.

Thus, as illustrated in FIGS. 3A–3E, the shaft 10 commences rotating at $T_A$ at a velocity above the preset threshold determined by $T_1$, and remains at this velocity until time $T_C$, after which the velocity decreases, as indicated by the relatively long intervals between the succeeding pulses occurring at times $T_E$ and $T_G$. At time $T_B$ (separated from $T_A$ by $T_2$ seconds), the output lines 32 and 34 switch states and remain in their switched state until $T_D$, corresponding to the time when the multivibrator state returns to its first binary state from its extended stay in its second binary state.

With this configuration, alarm devices may be coupled to lines 32 or 34. In operation, the alarm device coupled to line 34 is an overspeed alarm, responsive to the signal on line 34 to be activated commencing when the interval between the pulses has continuously been less than $T_1$ seconds for a period exceeding $T_2$ seconds. The overspeed alarm device then continues to be activated until the next interpulse interval which exceeds $T_1$. Thus, the system may monitor the rotation of shaft 10 for overspeed, activating an alarm whenever the velocity exceeds a predetermined limit for more than a predetermined period ($T_2$).

The alarm device coupled to line 32 is an underspeed alarm, responsive to the signal on line 32 to be activated commencing as soon as the shaft speed is determined to have fallen below a predetermined limit, i.e. $T_1$ seconds after the most recent pulse. The underspeed alarm device continues to be activated until the interval between pulses has continuously been less than $T_1$ seconds for a period exceeding $T_2$ seconds. Thus, the system may monitor the rotation of shaft 10 for underspeed, activating an alarm as soon as the velocity drops below a predetermined limit which continues until the shaft speed has returned at least to the limit velocity for $T_2$ seconds.

Figure 4:
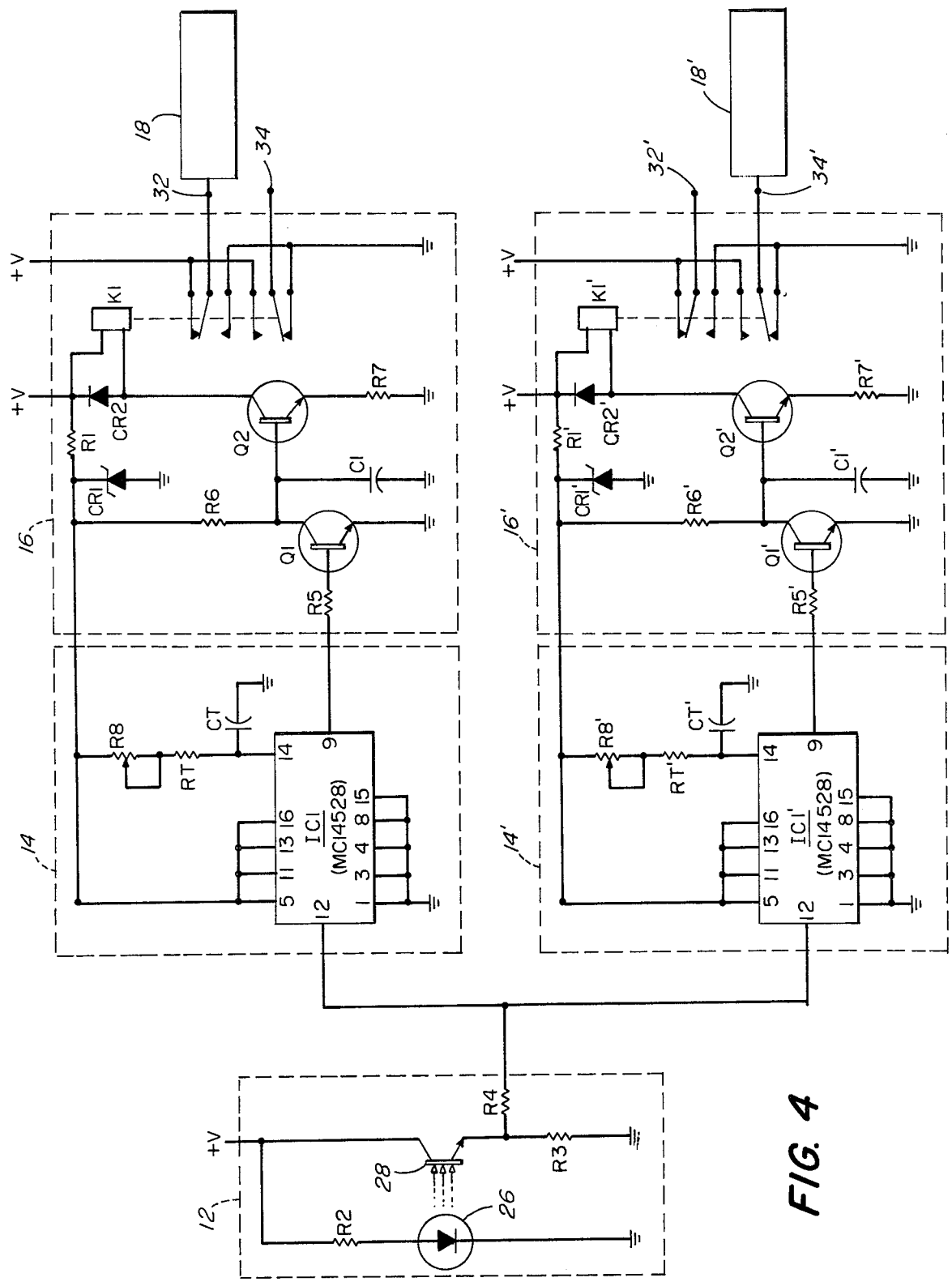
FIG. 4 shows, in schematic form, an exemplary circuit for an alternative system embodying the present invention.

The present invention may also be configured to provide a system for monitoring shaft rotation to provide an alarm when the rotational velocity passes outside a predetermined range. In this latter configuration, shown in FIG. 4 sensor assembly 12 drives a pair of on-delay and off-delay circuits and associated alarms 14, 16, 18 and 14', 16', 18', respectively. The first such on-delay circuit and off-delay circuit (blocks 14 and 16 in FIG. 4) may be substantially similar to blocks 14 and 16, respectively, of FIG. 2, with the associated alarm device 18 being connected to terminal 32, and $R_T$ and $C_T$ adjusted to provide an alarm when the shaft speed falls below the lower limit of the range. The second on-delay circuit and off-delay, circuit (blocks 14' and 16' in FIG. 4) may also be similar to blocks 14 and 16, respectively, of FIG. 2, but with the associated alarm device 18 being connected to terminal 34, and $R_T$ and $C_T$ adjusted to provide an alarm when the shaft speed rises above the upper limit of the range. In this configuration, the product (R8' + $R_T'$)·$C_T$ is representative of a first predetermined period ($T_1'$), the product R6'·Cl' is representative of a second predetermined period ($T_2'$), the product (R8 + $R_T$)·$C_T$ is representative of a third predetermined period ($T_3'$), and the product R6·Cl is representative of a fourth predetermined period ($T_4 40$). The periods T1' and $T_2'$ and the periods $T_3 40$ and $T_4 40$ correspond to the periods $T_1$ and $T_2$ described above in conjunction with FIGS. 1–3. These latter periods may be individually adjusted so that in operation, the alarm device 18' coupled to line 34' is an overspeed alarm, responsive to the signal on line 34', and is activated commencing when the interval between the pulses has continuously been less than $T_1'$ seconds for a period exceeding $T_2'$ seconds. The overspeed alarm device 18' then continues to be activated until the next interpulse interval which exceeds $T_1'$. Thus, the portion of the system including blocks 12, 14', 16' and 18' in FIG. 4 may monitor the rotation of a shaft for overspeed, activating an alarm whenever the velocity exceeds a predetermined limit (determined by $T_1'$) for more than a predetermined period ($T_2'$).

The alarm device 18 coupled to line 32 is an underspeed alarm, responsive to the signal on line 32, and is activated commencing as soon as the shaft speed is determined to have fallen below a predetermined limit, i.e. $T_3$ seconds after the most recent pulse. The underspeed alarm 18 device continues to be activated until the interval between pulses has continuously been less than $T_3$ seconds for a period exceeding $T_4$ seconds. Thus, the portion of the system including blocks 12, 14, 16 and 18 in FIG. 4 may monitor the rotation of a shaft for underspeed, activating an alarm as soon as the velocity drops below a predetermined limit (determined by $T_3'$) which continues until the shaft speed has returned at least to the limit velocity for $T_4'$ seconds.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for monitoring the rotational velocity of a shaft comprising:
   A. a shaft pulse generating means for providing a series of pulses having an instantaneous repetition rate proportional to the rotational velocity of said shaft,
   B. an off-delay circuit means including a retriggerable monostable multivibrator, said multivibrator being responsive to each pulse of said series to:
   switch to a first binary state if in a second binary state at the time of said pulse, or
   remain in said first state if in said first binary state at the time of said pulse, and
   being further responsive to the most recent pulse in said series to:
   switch from said first binary state to a second binary state after a first predetermined period has elapsed following said most recent pulse, and
   said multivibrator including means to generate a state signal representative of its current binary state,
   C. an on-delay circuit means responsive to said state signal to generate a control signal representative of a first binary state when said multivibrator is in its first binary state and has been in that state continuously for more than a second predetermined period, and representative of a second binary state when said multivibrator is in its first binary state and has been in that state continuously for less than said second predetermined period, or when said multivibrator is in its second binary state.

2. The system according to claim 1 wherein said shaft pulse generating means includes:
   A. a chopper disc means coupled to rotate with said shaft, said disc including a plurality of regions arranged in a circular track about the rotational axis of said disc with adjacent regions being characterized by a different one of two detectable characteristics, and
   B. an associated sensor means adjacent to a portion of said track and adapted to detect the characteristic of one of said regions at a time as said disc rotates about said axis, and to generate a pulse each time a region characterized by one of said detectable characteristics is adjacent to said sensor means.

3. The system according to claim 2 wherein alternate regions of said disc are transmissive to electromagnetic radiation, and wherein said sensing means includes a source on one side of said disc for directing electromagnetic radiation at said track, and a detector on the other side of said disc for detecting portions of said radiation passing through said transmissive regions.

4. The system according to claim 3 wherein said source provides radiation in the infra-red region of the spectrum and said detector is sensitive to said spectral region.

5. A system according to claim 1 further comprising an overspeed alarm means responsive to said control signal whereby said overspeed alarm means is activated commencing when the interval between said pulses has continuously been less than said first predetermined period for a period equal to said second predetermined period and terminating at a time following the most recent pulse when the interval between that time and said most recent pulse equals said first predetermined period, said overspeed alarm means being inactive otherwise.

6. The system according to claim 5 wherein said shaft pulse generating means includes:
   A. a chopper disc means coupled to rotate with said shaft, said disc including a plurality of regions arranged in a circular track about the rotational axis of said disc with adjacent regions being characterized by a different one of two detectable characteristics, and
   B. an associated sensor means adjacent to a portion of said track and adapted to detect the characteristic of one of said regions at a time as said disc rotates about said axis, and to generate a pulse each time a region characterized by one of said detectable characteristics is adjacent to said sensing means.

7. The system according to claim 6 wherein alternate regions of said disc are transmissive to electromagnetic radiation, and wherein said disc are transmissive to electromagnetic radiation, and wherein said sensing means includes a source on one side of said disc for directing electromagnetic radiation at said track, and a detector on the other side of said disc for detecting portions of said radiation passing through said transmissive regions.

8. The system according to claim 7 wherein said source provides radiation in the infra-red region of the spectrum and said detector is sensitive to said spectral region.

9. A system according to claim 1 further comprising an underspeed alarm means responsive to said control signal whereby said underspeed alarm means is activated commencing at a time following the most recent pulse when the interval between that time and said most recent pulse equals said first predetermined period and terminating when the interval between said pulses has continuously been less than said first predetermined period for a period equal to said second predetermined period, said underspeed alarm being inactive otherwise.

10. The system according to claim 9 wherein said shaft pulse generating means includes:
    A. a chopper disc means coupled to rotate with said shaft, said disc including a plurality of regions arranged in a circular track about the rotational axis of said disc with adjacent regions being characterized by a different one of two detectable characteristics, and
    B. an associated sensor means adjacent to a portion of said track and adapted to detect the characteristic of one of said regions at a time as said disc rotates about said axis, and to generate a pulse each time a region characterized by one of said detectable characteristics is adjacent to said sensing means.

11. The system according to claim 10 wherein alternate regions of said disc are transmissive to electromagnetic radiation, and wherein said sensor means includes a source on one side of said disc for directing electromagnetic radiation at said track, and a detector on the other side of said disc for detecting portions of said radiation passing through said transmissive regions.

12. The system according to claim 11 wherein said source provides radiation in the infra-red region of the spectrum and said detector is sensitive to said spectral region.

13. A system for monitoring the rotational velocity of a shaft comprising:
   A. an upper limit monitor means including:
      i. a shaft pulse generating means for providing a series of pulses having an instantaneous repetition rate proportional to the rotational velocity of said shaft,
      ii. a first off-delay circuit means including a retriggerable monostable multivibrator, said multivibrator being responsive to each pulse of said series to:
         switch to a first binary state if in a second binary state at the time of said pulse, or
         remain in said first state if in said first binary state at the time of said pulse, and
         being further responsive to the most recent pulse in said series to:
            switch from said first binary state to a second binary state after a first predetermined period has elapsed following said most recent pulse, and
         said multivibrator including means to generate an upper limit monitor state signal representative of its current binary state,
      iii. a first on-delay circuit means responsive to said state signal to generate an upper limit monitor control signal representative of one binary state when said multivibrator is in its first binary state and has been in that state continuously for more than a second predetermined period, and representative of the other binary state when said multivibrator is in its first binary state and has been in that state continuously for less than said second predetermined period, or when said multivibrator is in its second binary state, and
   B. a lower limit monitor means including:
      i. said shaft pulse generating means
      ii. a second off-delay circuit means including a retriggerable monostable multivibrator, said multivibrator being responsive to each pulse of said series to:
         switch to a first binary state if in a second binary state at the time of said pulse, or
         remain in said first state if in said first binary state at the time of said pulse, and
         being further responsive to the most recent pulse in said series to:
            switch from said first binary state to a second binary state after a third predetermined period has elapsed following said most recent pulse, and
         said multivibrator including means to generate a lower limit monitor state signal representative of its current binary state,
      iii. a second on-delay circuit means responsive to said lower limit monitor state signal to generate a lower limit monitor control signal representative of one binary state when said multivibrator is in its first binary state and has been in that state continuously for more than a fourth predetermined period, and representative of the other binary state when said multivibrator is in its first binary state and has been in that state continuously for less than said fourth predetermined period, or when said multivibrator is in its second binary state.

14. A system according to claim 13
   wherein said upper limit monitor means further comprises an overspeed alarm means responsive to said upper limit monitor control signal whereby said overspeed alarm means is activated commencing when the interval between said pulses has continuously been less than said first predetermined period for a period equal to said second predetermined period and terminating at a time following the most recent pulse when the interval between that time and said most recent pulse equals said first predetermined period, said overspeed alarm means being inactive otherwise, and
   wherein said lower limit monitor means further comprises an underspeed alarm means responsive to said lower limit monitor control signal whereby said underspeed alarm means is activated commencing at a time following the most recent pulse when the interval between that time and said most recent pulse equals said third predetermined period and terminating when the interval between said pulses has continuously been less than said third predetermined period for a period equal to said fourth predetermined period, said underspeed alarm being inactive otherwise.

15. The system according to claim 14 wherein said shaft pulse generating means includes:
   A. a chopper disc means coupled to rotate with said shaft, said disc including a plurality of regions arranged in a circular track about the rotational axis of said disc with adjacent regions being characterized by a different one of two detectable characteristics, and
   B. an associated sensor means adjacent to a portion of said track and adapted to detect the characteristic of one of said regions at a time as said disc rotates about said axis, and to generate a pulse each time a region characterized by one of said detectable characteristics is adjacent to said sensor means.

16. The system according to claim 15 wherein alternate regions of said disc are transmissive to electromagnetic radiation, and wherein said sensing means includes a source on one side of said disc for directing electromagnetic radiation at said track, and a detector on the other side of said disc for detecting portions of said radiation passing through said transmissive regions.

17. The system according to claim 16 wherein said source provides radiation in the infra-red region of the spectrum and said detector is sensitive to said spectral region.

* * * * *